United States Patent
Zhang et al.

(10) Patent No.: US 12,055,185 B2
(45) Date of Patent: Aug. 6, 2024

(54) SEALING DEVICE FOR A TAPERED-ROLLER BEARING UNIT

(71) Applicant: AKTIEBOLAGET SKF, Gothenburg (SE)

(72) Inventors: Yi Zhang, Shanghai (CN); Héctor Villalobos Valerio, Turin (IT); Pietro Fabio Picatto, Turin (IT); Daniele Duch, San Gillio (IT)

(73) Assignee: AKTIEBOLAGET SKF (SE)

( * ) Notice: Subject to any disclaimer, the term of this patent is extended or adjusted under 35 U.S.C. 154(b) by 44 days.

(21) Appl. No.: 17/834,346

(22) Filed: Jun. 7, 2022

(65) Prior Publication Data

US 2022/0403887 A1 Dec. 22, 2022

(30) Foreign Application Priority Data

Jun. 17, 2021 (IT) .................. 102021000015800

(51) Int. Cl.
*F16C 33/78* (2006.01)
*F16C 19/38* (2006.01)

(52) U.S. Cl.
CPC ........ F16C 33/7883 (2013.01); F16C 19/385 (2013.01); F16C 33/7823 (2013.01)

(58) Field of Classification Search
CPC ............... F16C 33/782; F16C 33/7823; F16C 33/7853; F16C 33/7856; F16C 33/7869; F16C 33/7879; F16C 33/7883
See application file for complete search history.

(56) References Cited

U.S. PATENT DOCUMENTS

| | | | |
|---|---|---|---|
| 6,217,225 B1 | 4/2001 | Shimizu et al. | |
| 6,550,973 B2* | 4/2003 | Yeo | F16C 33/7883 384/484 |
| 7,926,816 B2* | 4/2011 | Shibayama | G01P 3/487 277/572 |
| 8,016,294 B2* | 9/2011 | Shibayama | F16C 33/7883 277/572 |
| 9,188,165 B2* | 11/2015 | Niebling | F16C 33/7866 |
| 10,344,803 B2* | 7/2019 | Ohmori | F16C 33/7823 |
| 10,527,101 B2* | 1/2020 | Shibayama | F16C 33/7883 |
| 10,935,137 B2* | 3/2021 | Lor | F16J 15/324 |
| 2009/0127796 A1* | 5/2009 | Kanzaki | F16J 15/4478 277/562 |

(Continued)

FOREIGN PATENT DOCUMENTS

| | | |
|---|---|---|
| CN | 104220768 | 3/2017 |
| DE | 102007057962 | 6/2009 |
| DE | 102016207227 | 11/2017 |

(Continued)

OTHER PUBLICATIONS

Search Report for corresponding Italy Patent Application No. 2021000015800 dated Mar. 1, 2022.

*Primary Examiner* — James Pilkington

(74) *Attorney, Agent, or Firm* — Reed Smith LLP

(57) ABSTRACT

A sealing device for sealing off a bearing unit from oil contaminants is disclosed herein. The sealing device comprises an annular metallic screen integral to a stationary inner ring, an annular metallic support integral to a rotatable outer ring, and an elastomeric element mounted on the support and comprises a radial lip and an axial lip that cooperate in a sliding and contacting manner with the screen.

17 Claims, 6 Drawing Sheets

(56) References Cited

U.S. PATENT DOCUMENTS

2016/0131257 A1    5/2016    Sakai et al.

FOREIGN PATENT DOCUMENTS

| EP | 2213913 |   | 8/2010 |
|----|---------|---|--------|
| ES | 1072606 |   | 8/2010 |
| JP | 958293 | * | 3/1997 |
| JP | 2008128378 | * | 6/2008 |
| JP | 2013242037 |   | 12/2013 |

* cited by examiner

SEALING DEVICE FOR A TAPERED-ROLLER BEARING UNIT

CROSS-REFERENCE TO RELATED APPLICATIONS

This application is based on and claims priority to Italian Patent Application No. 102021000015800 filed on Jun. 17, 2021, under 35 U.S.C. § 119, the disclosure of which is incorporated herein by reference.

FIELD

In bearing units, sealing devices are used to prevent contaminants from entering the bearing unit and to prevent oil and lubricant from leaving the bearing unit.

BACKGROUND

Bearing units for use in a wheel hub of heavy duty vehicles are known. The wheel hub is provided with two internal annular seats which have, inserted inside them, two bearing units, e.g. two tapered-roller bearing units. The two tapered-roller bearing units are internally engaged by a stationary element and externally engaged by a rotatable element that in turn is engaged by a drive shaft. The drive shaft is connected to the wheel hub and defines a front chamber, which is filled with lubricating oil.

In such applications, there is a large amount of contamination due to axle lubrication oil. Therefore suitable sealing devices are necessary for protecting the bearing unit both from the oil and from other contaminants.

BRIEF DESCRIPTION OF THE DRAWINGS

The disclosure will now be described with reference to the accompanying drawings which illustrate non-limiting exemplary embodiments thereof, in which.

DETAILED DESCRIPTION

Known sealing devices for bearing units are formed as one piece and integral with an element that is in turn integral with a first ring of a bearing unit. A contact lip of the sealing device ensures a seal owing to interference created when mounting the sealing device in relation to a surface of another element that is integral with a second ring of the bearing unit.

Known sealing devices include one or more projections—called lips—that make contact with rotating surfaces integral with a rotating ring of the bearing unit. In this way, the sealing device prevents entry of contaminants from outside of the bearing unit, protecting internal components of the bearing unit. Another important function of a sealing device is that of preventing lubricants present inside the bearing unit from escaping.

The known solutions, however, can be unreliable when operating under conditions of heavy duty vehicles. Infiltration of oil, for example, axle oil contamination, can cause damage to the wheel hub.

It is therefore necessary to define a sealing device with an excellent sealing performance that does not have the aforementioned drawbacks.

In order to overcome the aforementioned drawbacks, this disclosure relates to a sealing device for use in severe conditions that is able to seal a rolling bearing unit, and in particular a bearing unit for a wheel hub assembly of a heavy-duty vehicle subject to heavy axle oil contamination.

The present disclosure also relates to a bearing unit and, in particular to a bearing unit for a wheel hub assembly for heavy duty vehicles, provided with a sealing device according to embodiments of the present disclosure.

Further preferred and/or particularly advantageous embodiments of a sealing device are described in accordance with the characteristic features presented in this disclosure.

With reference to the aforementioned figures and purely by way of non-limiting examples, the present disclosure will now be described with reference to a bearing unit of a wheel hub assembly for heavy duty vehicles provided with a sealing device according to this disclosure suitable for use in severe conditions for sealing off the bearing unit from axle oil contamination.

Figure 1:
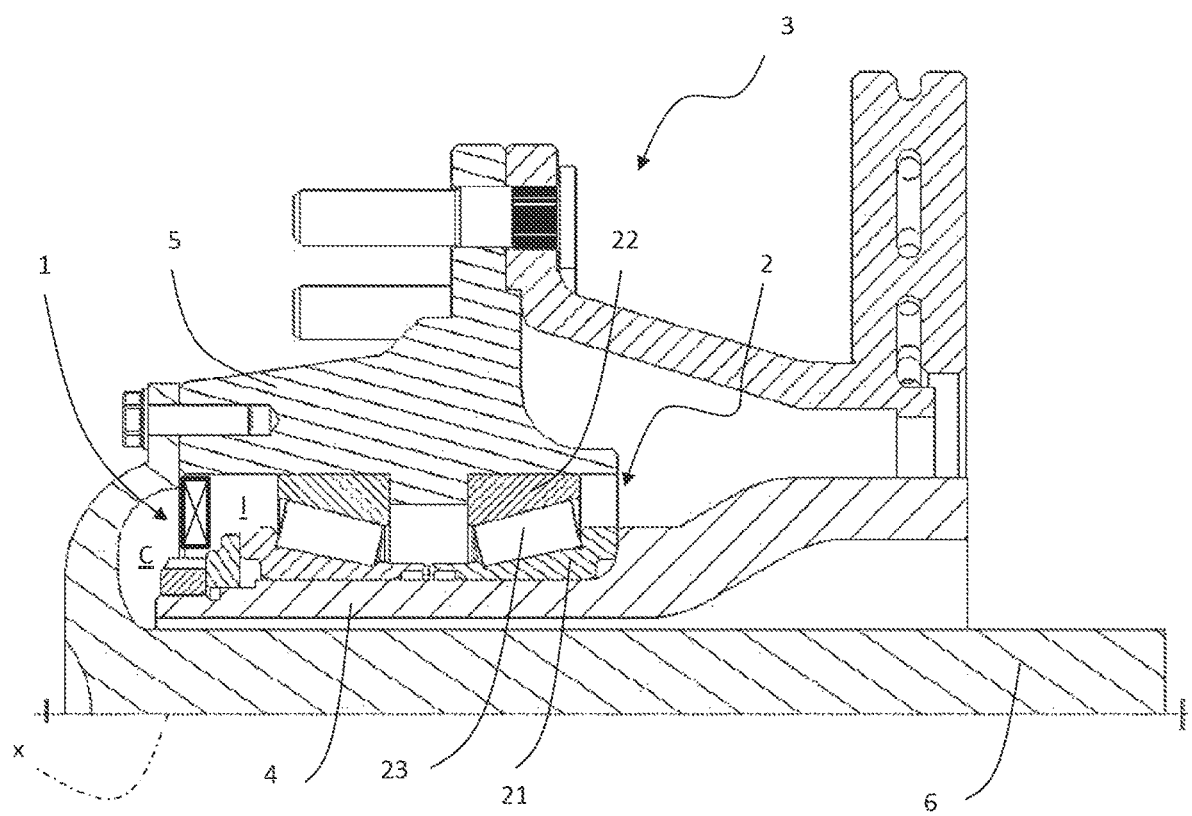
FIG. 1 is a cross-section of a wheel hub assembly for heavy duty vehicles provided with a tapered-roller bearing unit according to exemplary embodiments of this disclosure.

FIG. 1 presents a sealing device 1, a bearing unit 2, and a wheel hub assembly 3.

In various embodiments, a wheel hub assembly 3 may be provided with two internal annular seats. The two internal annular seats may have two bearing units 2 inserted inside them. Bearing units 2 may be tapered-roller bearing units engaged internally by a stationary element 4 and externally by a rotating element 5. Rotating element 5 may in turn be engaged by a drive shaft 6. Drive shaft 6 may be connected to wheel hub 3 and define a front chamber C that is filled with lubricating oil.

Tapered-roller bearing units 2 may have a central axis of rotation X and each tapered-roller bearing unit 2 may include a stationary radially inner ring 21, a rotatable radially outer ring 22, and a row of rolling members 23, e.g. tapered rollers 23. Radially inner ring 21 engages internally with stationary element 4, while radially outer ring 22 engages externally with rotating element 5. Stationary element 5 and rotating element 5 define an annular interspace inside which a sealing device 1 is housed.

In the whole of the present disclosure, terms and expressions indicating positions and orientations, such as "radial" and "axial" are understood as being in relation to a central axis of rotation X of a bearing unit 2. Expressions such as "axially outer" and "axially inner" refer to an assembled condition of a wheel hub assembly 3 and indicate respectively an outer-lying wheel side and an inner side opposite to a wheel side.

Figure 2:
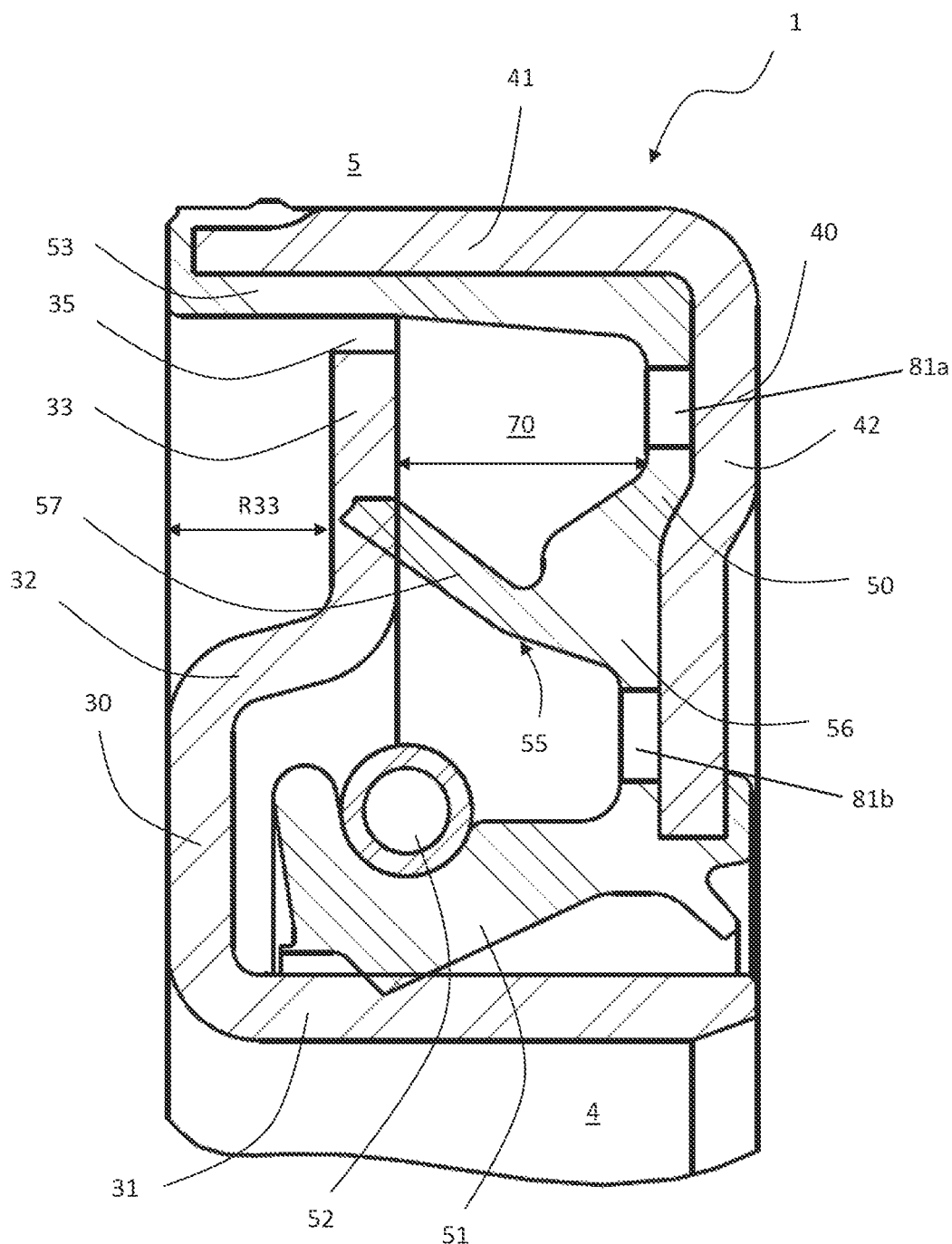
FIG. 2 is a detail of the wheel hub assembly shown in FIG. 1 in which a sealing device for a bearing unit is housed between elements integral with an inner ring and an outer ring of the bearing unit according to exemplary embodiments of this disclosure.

With reference to FIG. 2, a sealing device 1 may include an annular metallic screen 30 mounted on stationary element 4 and integral with radially inner ring 21, an annular metallic support 40 mounted on rotating element 5 and integral with radial outer ring 22, and an elastomeric element 50 mounted on support 40. Elastomeric element 50 may further include a radial lip 51 and an axial lip 55 which cooperate with screen 30 in a sliding and contacting manner. In some embodiments, elastomeric element 50 may be discontinuous at one or more points of discontinuity, e.g., 81a and 81b.

Metallic support 40 may include a first cylindrical portion 41 coupled with rotating element 5 and a first shaped flange 42 integral with first cylindrical portion 41.

Screen 30 may include a second cylindrical portion 31 coupled with stationary element 4, and a second shaped flange 32 integral with cylindrical portion 31 and defining with first shaped flange 42 an axial gap 70.

Radial lip 51 may be in sliding radial contact with second cylindrical portion 31 and provided with an annular spring 52 for maintaining the sliding contact. Axial lip 55 may be in axial contact with second shaped flange 32.

In various embodiments, axial lip 55 completely seals the axial gap 70 and may include a proximal support portion 56 connected to first shaped flange 42 and a distal sealing portion 57 integral with proximal support 56. Distal sealing portion 57 may cooperate slidingly with a radial distal portion 33 of second shaped flange 32.

Advantageously, radial distal portion 33 of second shaped flange 32 may be inset in an axially inner direction such that an axial recess R33 is defined on an axially outer side of radial distal portion 33.

Advantageously, radial distal portion 33 of second shaped flange 32 may form with cylindrical portion 41 a labyrinth 35 that cooperates with axial lip 55 in order to ensure sealing performance. In various embodiments, radial distal portion 33 may form a labyrinth 35 with a cylindrical portion 53 of elastomeric element 50 that covers cylindrical portion 41.

Figure 3:
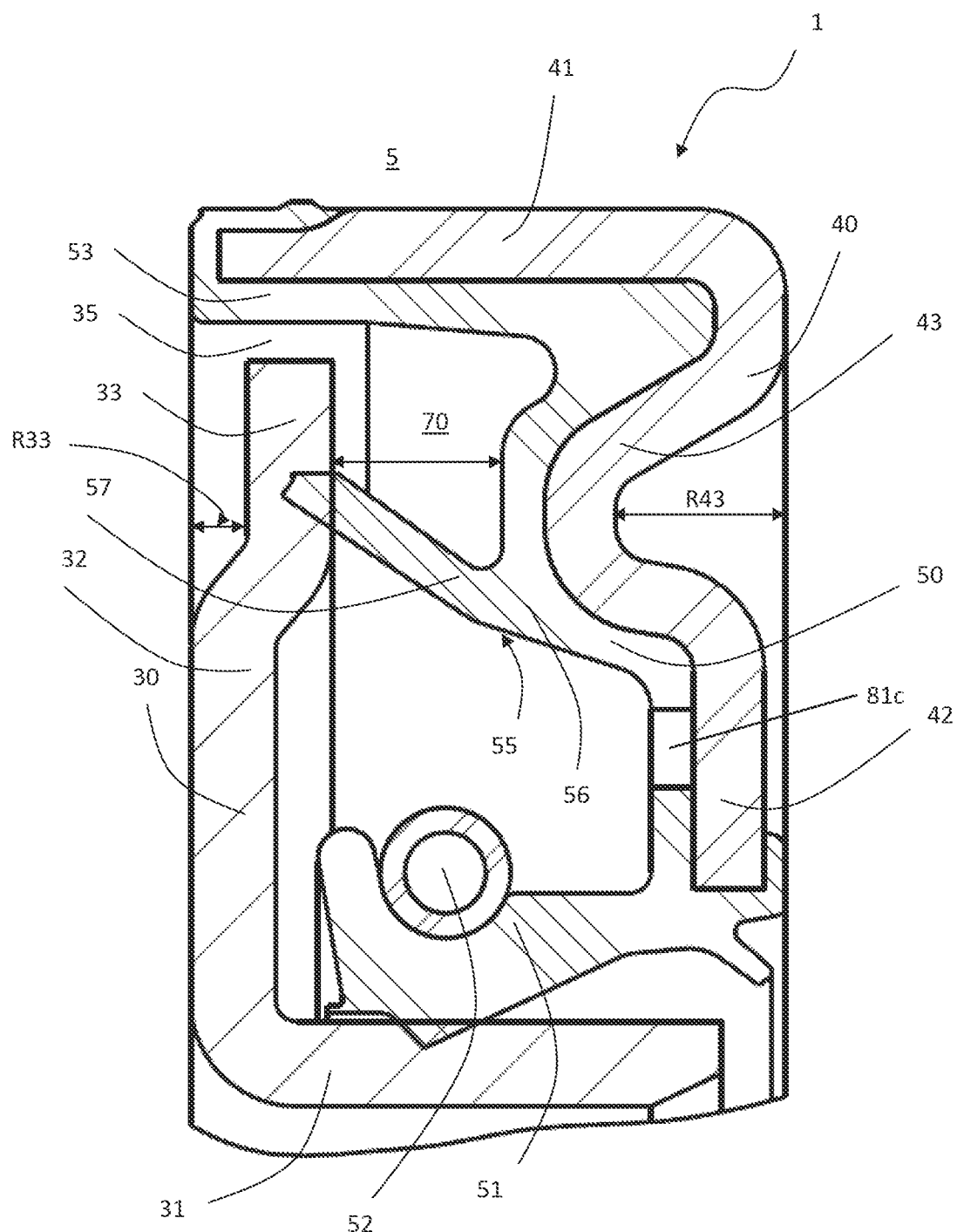
FIG. 3 is a detail of the wheel hub assembly shown in FIG. 1 in which a sealing device for a bearing unit is provided according to exemplary embodiments of the present disclosure.

With reference to FIG. 3, various embodiments of a sealing device 1 may include a radial distal portion 33 of a second shaped flange 32 that is practically not inset in an axially inner direction, but still defines an axial recess R33. A first shaped flange 42 may include a central portion 43 inset in the axially outer direction, i.e. axially towards second shaped flange 32, and defining a recess R43. While FIG. 3 depicts a recess R43 with a curved profile, it should be appreciated that this is merely one non-limiting example. In other embodiments, a recess R43 may have, e.g., an angular profile or a square profile.

As a result of recess R43, a proximal support portion 56 may have a reduced axial extension as compared to embodiments of a proximal support portion 56 consistent with FIG. 2. In other words, introducing a recess R43 results in a reduced axial length of a recess R33 and a reduced axial extension of a proximal support portion 56, while an axial length of a distal sealing portion 57 and an axial length of an axial lip 55 remain practically unchanged, with respect to embodiments of a sealing device 1 consistent with FIG. 2.

Advantageously, radial distal portion 33 and a cylindrical portion 53 of an elastomeric element 50 form a labyrinth 35 that cooperates with axial lip 55 to promote improved sealing performance. In some embodiments, elastomeric element 50 may be discontinuous at a point of discontinuity 81c.

Figure 4:
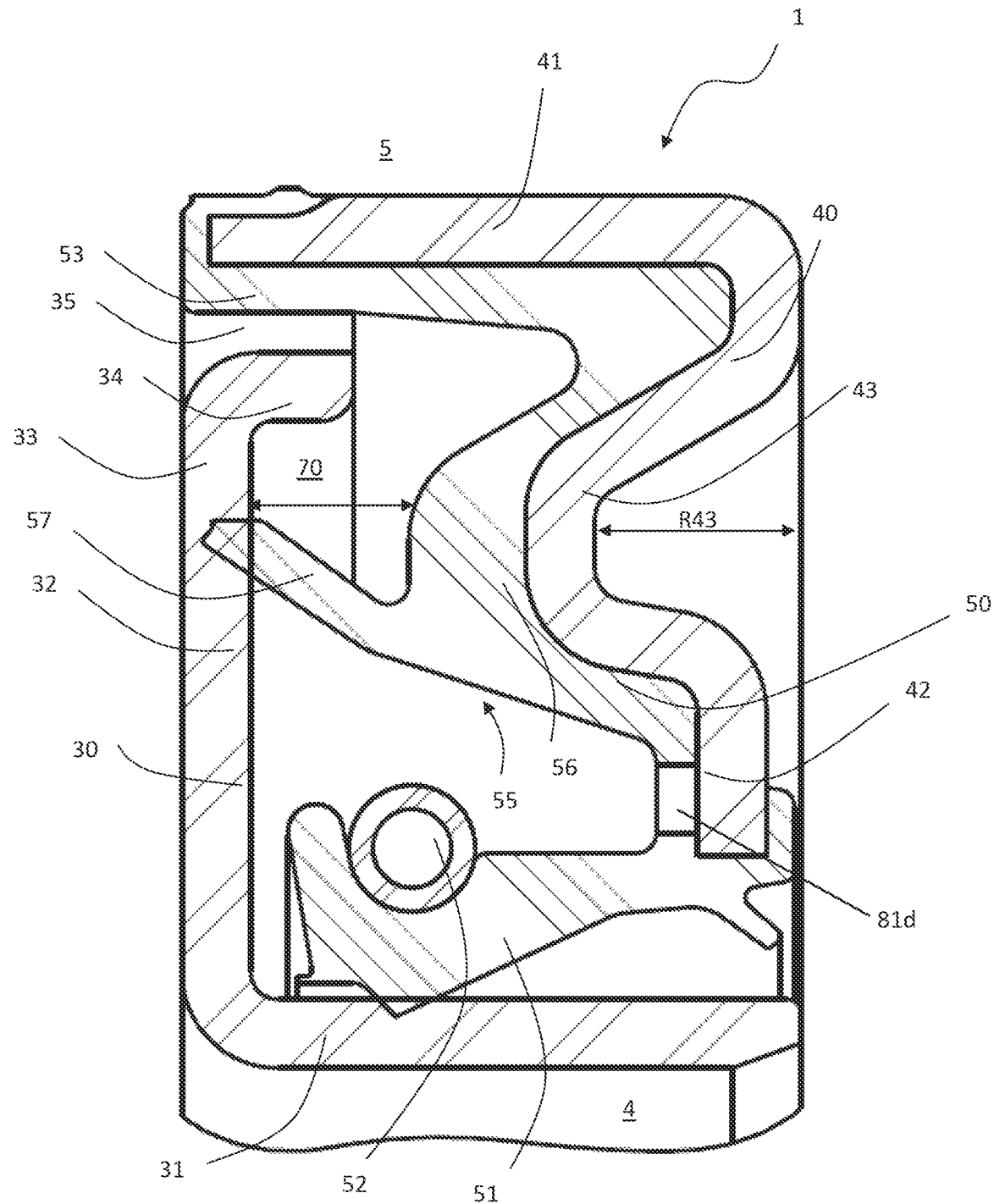
FIG. 4 is a detail of the wheel hub assembly shown in FIG. 1 in which a sealing device for a bearing unit is provided according to exemplary embodiments of the present disclosure.

With reference to FIG. 4, a second shaped flange 32 may be formed as a flat annular element such that no axial recess is defined on an axially outer side of second shaped flange 32. In such embodiments, a screen 30 may have a third cylindrical portion 34 that extends axially inward towards a central portion 43. Third cylindrical portion 34 may face radially a cylindrical portion 53 of an elastomeric element 50 and form a labyrinth 35. Advantageously, labyrinth 35 according to FIG. 4 may be axially longer than a labyrinth 35 according to embodiments consistent with FIG. 3, resulting in increased sealing capacity, further preventing entry of oil and contaminants into bearing unit 2. In some embodiments, elastomeric element 50 may be discontinuous at a point of discontinuity 81d.

Figure 5:
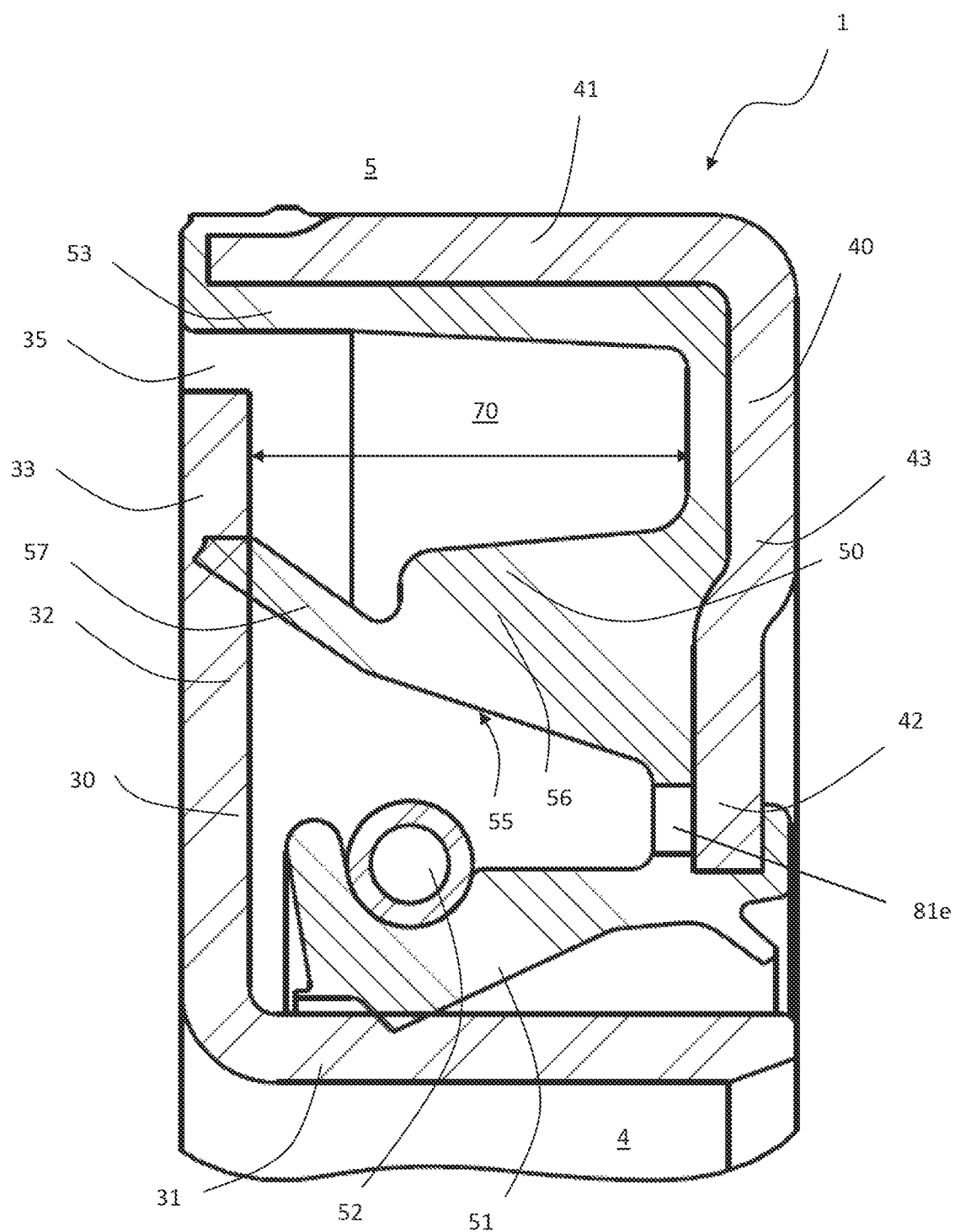
FIG. 5 is a detail of the wheel hub assembly shown in FIG. 1 in which a sealing device for a bearing unit is provided according to exemplary embodiments of the present disclosure.

With reference to FIG. 5, embodiments of a sealing device 1 may include a screen 30 with a second shaped flange 32 formed as a flat flange such that no axial recess is formed on an axially outer side of second shaped flange 32. Sealing device 1 may further include a metallic support 40 having a central portion 43 that is formed flat such that no axial recess is formed on an axially outer side of central portion 43. In embodiments according to FIG. 5, a distal sealing portion 57 and an axial lip 55 have an axial length that remain practically unchanged, with respect to embodiments of a sealing device 1 consistent with FIGS. 2, 3, and 4. Due to the absence of recesses on the axially outer side of first shaped flange 42 and the axially outer side of second shaped flange 32, a proximal support portion 56 may have a greater axial extension than embodiments of a sealing device 1 according to FIGS. 2, 3, and 4.

Advantageously, in embodiments according to FIG. 5, a radial distal portion 33 of second shaped flange 32 and a cylindrical portion 53 of an elastomeric element 50 may form a labyrinth 35, which cooperates with axial lip 55 to ensure improved sealing performance. Further, in some embodiments, elastomeric element 50 may be discontinuous at a point fo discontinuity 81e.

While not depicted, embodiments according to FIG. 5 may further include a third cylindrical portion 34 that extends axially inward towards a central portion 43. Third cylindrical portion 34 may face radially a cylindrical portion 53 of an elastomeric element 50 and form a labyrinth 35, increasing the axial length of labyrinth 35 as compared to labyrinth 35 presented in FIG. 5.

Whatever an axial length of an axial gap 70 is, an axial length of distal portion 57 of axial lip 55 in its deformed mounted configuration is constant.

Figure 6:
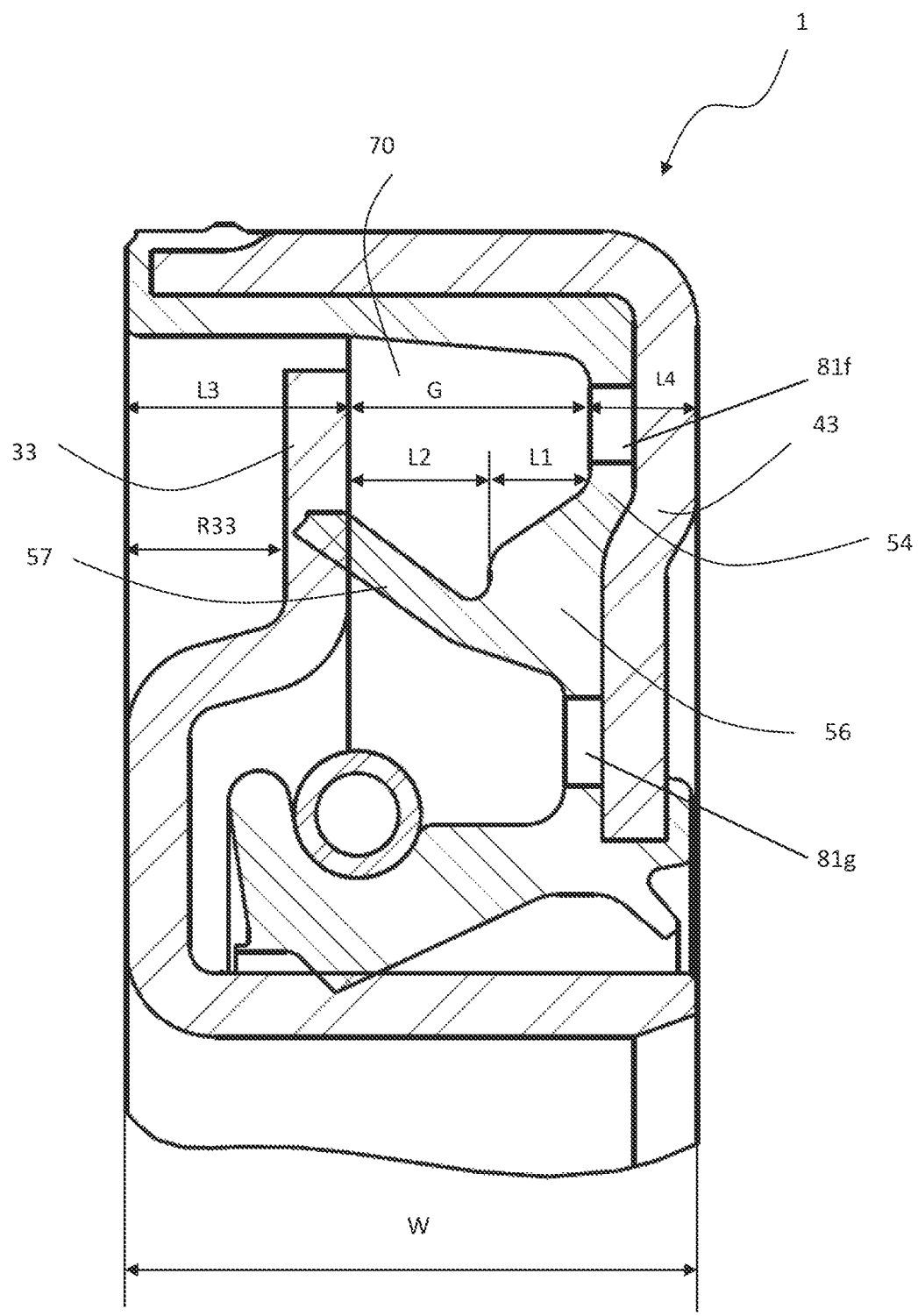
FIG. 6 is a detail view of a sealing device for a bearing unit provided in the wheel hub assembly of FIG. 1 illustrating dimensions of the sealing device.

FIG. 6 illustrates embodiments of a sealing device 1. Sealing device 1 may have an overall axial width W. An axial gap 70 may have an axial width G defined by a minimum internal distance between distal portion 33 of second shaped flange 42 and central portion 54 of elastomeric element 50. Proximal support portion 56 may have an axial length L1. Distal sealing portion 57 may have an axial length L2 in a deformed, mounted configuration, where G=L1+L2. An axial length L3 may be defined as a sum of an axial thickness of distal portion 33 and an axial length of a recess R33. An axial length L4 may be defined by a sum of an axial thickness of central portion 43, an axial thickness of central portion 54, and of an axial length of recess R43 (not shown in FIG. 6). In some embodiments, elastomeric element 50 may be discontinuous at one or more points of discontinuity, e.g., 81f and 81g.

In embodiments consistent with this disclosure, width G of axial gap 70 may be defined by a difference between overall axial width W of sealing device 1 and a sum of axial lengths L3 and L4.

In embodiments in which a first shaped flange 42 and a second shaped flange 32 are defined by respective flat annular elements, e.g., embodiments consistent with FIG. 5, width G of axial gap 70 is greater than ¾ of an axial length of axial lip 55 and may not exceed ¹⁵/₁₆ thereof in order to ensure that axial lip 55 is in sliding contact with second shaped flange 32.

Moreover, a length of an axial projection of proximal support portion 56 is between ⅙ and ⁵/₇ of an axial length of axial lip 55.

Advantageously, in embodiments in which first shaped flange 42 or second shaped flange 32 are axially inset towards second shaped flange 32 or first shaped flange 42, respectively, an axial length of proximal support portion 56 is almost identical to an axial length of distal sealing portion 57.

Axial lip 55 and screen 30 create a barrier that protects against oil contaminants, e.g. metal particles, fibers, and impurities in the oil. Filtered oil may then be stopped by a seal formed by radial lip 51. In this way the working duration of a sealing device 1 is increased and bearing unit 2 is able to work in optimal operating conditions during a longer useful life.

Sealing devices consistent with this disclosure differ from known solutions because they further include a stationary, annular, metallic, screen and an elastomeric sealing element that includes an additional annular lip, which is practically axial, making contact with the annular screen. Furthermore, a distal sealing portion of the additional annular lip has a constant axial dimension independent of various configurations of the annular screen and of the annular support.

The metallic screen and an additional axial lip limits the flow of the contaminants which reaches the radial lip, allowing the radial lip to function as preventing the entry of oil on the side of the bearing and, consequently, increasing the duration of the sealing device during its useful life.

In addition to the embodiments described in this disclosure it must be understood that there exist numerous other variants. It must also be understood that these embodiments are only examples and do not limit either the scope of the disclosure, nor its applications, nor its possible configurations. On the contrary, although the description above allows a person or ordinary skill in the art to implement the present disclosure at least according to one of its exemplary embodiments, it must be understood that many variants of the components described are possible, without thereby departing from the scope of the disclosure, interpreted literally and/or in accordance with their legal equivalents.

We claim:

1. A sealing device for a bearing unit, the sealing device comprising:
    an annular metallic support integral with a rotatable radially outer ring of the bearing unit, the annular metallic support comprising a first cylindrical portion integral with the radially outer ring and a first shaped flange integral with the first cylindrical portion;
    an annular metallic screen integral with a stationary radially inner ring of the bearing unit, the screen comprising a second cylindrical portion integral with the radially inner ring and a second shaped flange integral with the second cylindrical portion, the second shaped flange comprising a radial distal portion,
    wherein an axial gap is defined between the second shaped flange and the first shaped flange; and
    an elastomeric element mounted on the annular metallic support, the elastomeric element comprising:
        a radial lip that cooperates in a sliding and a contacting manner with the annular metallic screen; and
        an axial lip comprising a proximal support portion connected to the first shaped flange and a distal sealing portion integral with the proximal support portion and having an axial length (L2), the distal sealing portion cooperating slidingly with the radial distal portion of the second shaped flange, wherein, the elastomeric element is discontinuous at a first position radially between the radial lip and the axial lip, and the axial lip completely seals the axial gap,
    wherein,
    an axial length of the axial gap is defined by a difference between an overall axial length of the sealing device and a sum of a first axial length and a second axial length,
    the first axial length is defined by a sum of an axial thickness of the radial distal portion of the second shaped flange and an axial length of a first recess defined on an axially outer side of the radial distal portion of the second shaped flange, the first recess extending in an axially inner direction towards the first shaped flange, and
    the second axial length is defined by a sum of a thickness of a central portion of the first shaped flange, a thickness of a central portion of the elastomeric element, and an axial length of a second recess defined on an axially outer side of the central portion of the first shaped flange, the second recess extending in an axially outward direction towards the second shaped flange.

2. The sealing device according to claim 1, wherein the axial length (L2) of the distal sealing portion is constant in a deformed mounting configuration.

3. The sealing device according to claim 2, wherein the proximal support portion comprises an axial length (L1) that is substantially identical to the axial length (L2) of the distal sealing portion when the distal sealing portion is in a deformed state.

4. The sealing device according to claim 2, wherein the radial lip contacts the second cylindrical portion of the annular metallic screen.

5. The sealing device according to claim 4, wherein the axial lip comprises an axial projection, wherein the axial length of the axial gap is between ¾ and ¹⁵/₁₆ of a length of the axial projection of the axial lip.

6. The sealing device according to claim 4, wherein the proximal support portion comprises an axial projection and the axial lip comprises an axial projection, the length of the axial projection of the proximal support portion being between ⅙ and ⁵/₇ of a length of the axial projection of the axial lip.

7. The sealing device according to claim 6, further comprising an annular spring configured to maintain sliding contact between the radial lip and the second cylindrical portion of the annular metallic screen.

8. A sealing device for a bearing unit, the sealing device comprising:
    an annular metallic support integral with a rotatable radially outer ring of the bearing unit, the annular metallic support comprising a first cylindrical portion integral with the radially outer ring and a first shaped flange integral with the first cylindrical portion;
    an annular metallic screen integral with a stationary radially inner ring of the bearing unit, the screen comprising a second cylindrical portion integral with the radially inner ring and a second shaped flange integral with the second cylindrical portion, the second shaped flange comprising a radial distal portion,
    wherein the second shaped flange and the first shaped flange define an axial gap between them; and
    an elastomeric element mounted on the annular metallic support, the elastomeric element comprising:

a radial lip that cooperates in a sliding and a contacting manner with the annular metallic screen;

an axial lip comprising a proximal support portion connected to the first shaped flange and a distal sealing portion integral with the proximal support portion and having an axial length (L2), the distal sealing portion cooperating slidingly with the radial distal portion of the second shaped flange; and wherein the elastomeric element is discontinuous at a first position radially between the radial lip and the axial lip, the axial lip completely seals the axial gap, an axial length of the axial gap is defined by a difference between an overall axial length of the sealing device and a sum of a first axial length and a second axial length, the first axial length is defined by a sum of an axial thickness of the radial distal portion of the second shaped flange and an axial length of a first recess defined on an axially outer side of the radial distal portion of the second shaped flange, and the second axial length is defined by a sum of a thickness of a central portion of the first shaped flange, a thickness of a central portion of the elastomeric element, and an axial length of a second recess defined on an axially outer side of the central portion of the first shaped flange, the second recess extending in an axially outward direction towards the second shaped flange.

9. The sealing device according to claim 8, further comprising an annular spring configured to maintain sliding contact between the radial lip and the second cylindrical portion of the annular metallic screen.

10. The sealing device according to claim 9, wherein the radial lip contacts the second cylindrical portion of the annular metallic screen.

11. The sealing device according to claim 10, wherein the proximal support portion comprises an axial length (L1) that is substantially identical to the axial length (L2) of the distal sealing portion when the distal sealing portion is in a deformed state.

12. The sealing device according to claim 11, wherein the axial length (L2) of the distal sealing portion is constant in a deformed mounting configuration.

13. A sealing device for a bearing unit, the sealing device comprising:
an annular metallic support integral with a rotatable radially outer ring of the bearing unit, the annular metallic support comprising a first cylindrical portion integral with the radially outer ring and a first shaped flange integral with the first cylindrical portion;
an annular metallic screen integral with a stationary radially inner ring of the bearing unit, the screen comprising a second cylindrical portion integral with the radially inner ring and a second shaped flange integral with the second cylindrical portion, the second shaped flange comprising a radial distal portion,
wherein the second shaped flange and the first shaped flange define an axial gap between them; and
an elastomeric element mounted on the annular metallic support, the elastomeric element comprising:
a radial lip that cooperates in a sliding and a contacting manner with the annular metallic screen;
an axial lip comprising a proximal support portion connected to the first shaped flange and a distal sealing portion integral with the proximal support portion and having an axial length (L2), the distal sealing portion cooperating slidingly with the radial distal portion of the second shaped flange; and
wherein the elastomeric element is discontinuity at a first position radially between the radial lip and the axial lip and a second position radially outer relative to the axial lip,
the axial lip completely seals the axial gap,
an axial length of the axial gap is defined by a difference between an overall axial length of the sealing device and a sum of a first axial length and a second axial length,
the first axial length is defined by a sum of an axial thickness of the radial distal portion of the second shaped flange and an axial length of a first recess defined on an axially outer side of the radial distal portion of the second shaped flange, and
the second axial length is defined by a sum of a thickness of a central portion of the first shaped flange, a thickness of a central portion of the elastomeric element, and an axial length of a second recess defined on an axially outer side of the central portion of the first shaped flange, the second recess extending in an axially outward direction towards the second shaped flange.

14. The sealing device according to claim 13, further comprising an annular spring configured to maintain sliding contact between the radial lip and the second cylindrical portion of the annular metallic screen.

15. The sealing device according to claim 14, wherein the radial lip contacts the second cylindrical portion of the annular metallic screen.

16. The sealing device according to claim 15, wherein the proximal support portion comprises an axial length (L1) that is substantially identical to the axial length (L2) of the distal sealing portion when the distal sealing portion is in a deformed state.

17. The sealing device according to claim 16, wherein the axial length (L2) of the distal sealing portion is constant in a deformed mounting configuration.

* * * * *